(12) United States Patent
Lapergue et al.

(10) Patent No.: US 7,322,180 B2
(45) Date of Patent: Jan. 29, 2008

(54) TURBO-JET ENGINE WITH FAN INTEGRAL WITH A DRIVE SHAFT SUPPORTED BY FIRST AND SECOND BEARINGS

(75) Inventors: Guy Lapergue, Rubelles (FR); Regis Servant, Vigneux sur Seine (FR); Gael Bouchy, La Chapelle Iger (FR)

(73) Assignee: Snecma Moteurs, Paris (FR)

( * ) Notice: Subject to any disclaimer, the term of this patent is extended or adjusted under 35 U.S.C. 154(b) by 401 days.

(21) Appl. No.: 11/023,601

(22) Filed: Dec. 29, 2004

(65) Prior Publication Data

US 2005/0172608 A1 Aug. 11, 2005

(30) Foreign Application Priority Data

Feb. 6, 2004 (FR) .................................. 04 01145

(51) Int. Cl.
*F02K 3/02* (2006.01)

(52) U.S. Cl. ..................... 60/226.1; 415/104

(58) Field of Classification Search ............... 60/791, 60/226.1; 415/104, 107, 229
See application file for complete search history.

(56) References Cited

U.S. PATENT DOCUMENTS

| | | | | |
|---|---|---|---|---|
| 3,534,557 A | * | 10/1970 | Adkin et al. ............... | 60/226.1 |
| 4,289,360 A | | 9/1981 | Zirin | |
| 5,029,439 A | | 7/1991 | Berneuil et al. | |
| 5,237,817 A | * | 8/1993 | Bornemisza et al. ....... | 60/226.1 |
| 5,433,584 A | * | 7/1995 | Amin et al. ............... | 415/229 |
| 6,009,701 A | | 1/2000 | Freeman et al. | |
| 6,135,712 A | * | 10/2000 | Chevrollier et al. ....... | 415/216.1 |
| 6,428,269 B1 | * | 8/2002 | Boratgis et al. ............. | 415/9 |
| 6,619,030 B1 | * | 9/2003 | Seda et al. ................ | 60/226.1 |
| 6,622,473 B2 | * | 9/2003 | Becquerelle et al. ...... | 60/226.1 |
| 6,846,158 B2 | * | 1/2005 | Hull ........................... | 416/1 |
| 6,877,950 B2 | * | 4/2005 | Liu ........................... | 415/111 |
| 7,097,412 B2 | * | 8/2006 | DiTomasso ................ | 415/9 |
| 2002/0069637 A1 | * | 6/2002 | Becquerelle et al. ...... | 60/226.1 |
| 2004/0020186 A1 | * | 2/2004 | Orlando et al. ........... | 60/226.1 |
| 2004/0047731 A1 | * | 3/2004 | Hull ........................... | 416/1 |
| 2005/0022501 A1 | * | 2/2005 | Eleftheriou et al. ....... | 60/226.1 |
| 2005/0172610 A1 | * | 8/2005 | Bart et al. .................. | 60/226.1 |
| 2005/0241290 A1 | * | 11/2005 | Lapergue et al. ......... | 60/226.1 |
| 2005/0276683 A1 | * | 12/2005 | Lapergue et al. ......... | 415/9 |
| 2007/0006569 A1 | * | 1/2007 | Brault et al. ............... | 60/226.1 |

FOREIGN PATENT DOCUMENTS

| | | |
|---|---|---|
| EP | 1 013 896 A2 | 6/2000 |
| FR | 2 752 024 | 2/1998 |

\* cited by examiner

*Primary Examiner*—William H. Rodriguez
(74) *Attorney, Agent, or Firm*—Oblon, Spivak, McClelland, Maier & Neustadt, P.C.

(57) ABSTRACT

A turbo-jet engine including a fixed structure and a fan rotor mounted on a drive shaft supported by a first bearing and a second bearing. The engine further comprises an axial retaining device configured to form an emergency bearing and to cooperate with the fixed structure and mounted rigidly to the drive shaft. The engine includes a structural flange on which the second bearing is fixed, and the axial retaining device comprises a retaining disk mounted on the drive shaft and configured to cooperate with a stop disk of the flange to axially retain the fan and form an emergency bearing.

14 Claims, 6 Drawing Sheets

TURBO-JET ENGINE WITH FAN INTEGRAL WITH A DRIVE SHAFT SUPPORTED BY FIRST AND SECOND BEARINGS

BACKGROUND OF THE INVENTION

1. Field of the Invention

The present invention pertains to the area of jet engines and more particularly to engines whose fan is integral with a drive shaft which is supported by a first bearing and a second bearing.

Said turbo-jet engine, from upstream to downstream in the direction of the exhaust stream, comprises a fan, one or more compressor stages, one or more turbine stages and an exhaust pipe. The fan comprises a rotor provided with blades on its circumference which, when caused to rotate, drive air into the turbo-jet engine. The fan rotor is supported by the low pressure rotor shaft of the engine. It is centred on the axis of the jet engine by a first bearing which is upstream from a second bearing joined to the fixed structure, to the intermediate casing in particular.

In the remainder of the description, insofar as the fan is mounted integral with the compressor shaft, which is the shaft of the low pressure rotor in a double-body engine, this shaft shall be designated by the single term compressor shaft.

The first bearing is supported by a support piece forming an enclosure around the compressor shaft, oriented downstream from the first bearing and being attached to a fixed structure of the jet engine. The second bearing is supported by a support piece that is also attached to a fixed structure of the jet engine.

It may happen that a fan blade is accidentally lost. The result is substantial imbalance on the compressor shaft which leads to loads and vibrations on the bearings, transmitted via their support pieces to the fixed structures of the jet engine which may therefore be damaged.

2. Description of the Related Art

To prevent the risk of too extensive damage to the jet engine, the structure may be over-dimensioned or, as proposed by patent FR 2 752 024, an uncoupling system for the first bearing may be provided. The support piece of the first bearing is attached to the structure of the jet engine by so-called shearing screws which contain a weakened portion causing their rupture if the loads applied are too high. Therefore, when an imbalance occurs on the compressor shaft, the stresses induced on the first bearing are transmitted to the shearing screws which break, uncoupling the support piece of the first bearing from the structure of the jet engine. According to one embodiment, the support of the second bearing is associated with the support of the first bearing, accompanying it in the event of uncoupling. The stresses caused by the imbalance are then no longer transmitted to the fixed structure of the jet engine by these support pieces.

However, after uncoupling of the bearings, the fan continues to rotate and it is possible that the compressor shaft is no longer able to rotate about its axis undergoing major displacement which may damage the fixed structure of the jet engine. Patent FR 2 752 024 provides in this case, on the fixed structure of the jet engine, for a ridge surrounding the support piece of the two bearings and acting as axial stop and as emergency bearing.

However, in this case, the emergency bearing is radially far distant from the original bearings, which completely modifies the distribution of stresses on the various engine parts.

Finally, since the second bearing is able, in some cases, to ensure the maintaining of the compressor shaft after uncoupling of the first bearing, it is not necessary for both bearings to be systematically uncoupled simultaneously, as it is always preferable to maintain the jet engine in configurations that are the closest to normal.

SUMMARY OF THE INVENTION

The present invention sets out to overcome these disadvantages.

For this purpose, the invention concerns a turbo-jet engine comprising a fixed structure, a fan rotor integral with a drive shaft supported by a first bearing and a second bearing, characterized in that it includes means forming axial retaining means for the fan rotor and/or forming an emergency bearing, cooperating with means of the fixed structure and mounted integral with the drive shaft.

Preferably, since the jet engine comprises a structural flange on which the second bearing is fixed, the means forming axial retaining means for the fan and/or forming an emergency bearing comprise a retaining disk mounted on the drive shaft and cooperating with a stop disk of the flange for axially retaining the fan, and a longitudinal sleeve of the flange to form an emergency bearing.

Further preferably, the means forming the axial retaining of the fan and/or an emergency bearing are arranged to transmit axial stresses directly to the drive shaft. If this were not the case, at the time of axial retaining of the fan, the stresses generated on the support pieces of the bearings could propagate along the support piece of the second bearing and lead to rupture of the lock nut of the second bearing on the compressor shaft. Such rupture would cancel out the axial retaining of the second bearing on the compressor shaft. As the fan would continue to rotate, it would drive the compressor shaft forwardly which could slide in the second bearing that is not axially retained, and onto the other elements fitted at this point. The result would be the expelling of the fan outside the jet engine whose consequences would be disastrous.

Advantageously, the second bearing comprises an inner ring, an outer ring and rollers mounted between said rings, the retaining disk comprises radial teeth bearing axially upon the teeth of the drive shaft and locked in rotation by longitudinal teeth of the inner ring of the second bearing.

BRIEF DESCRIPTION OF THE DRAWINGS

The invention will be more readily understood through the following description of a preferred embodiment of the turbo-jet engine of the invention, with reference to the appended drawings in which.

DETAILED DESCRIPTION OF THE PREFERRED EMBODIMENTS

Figure 1:
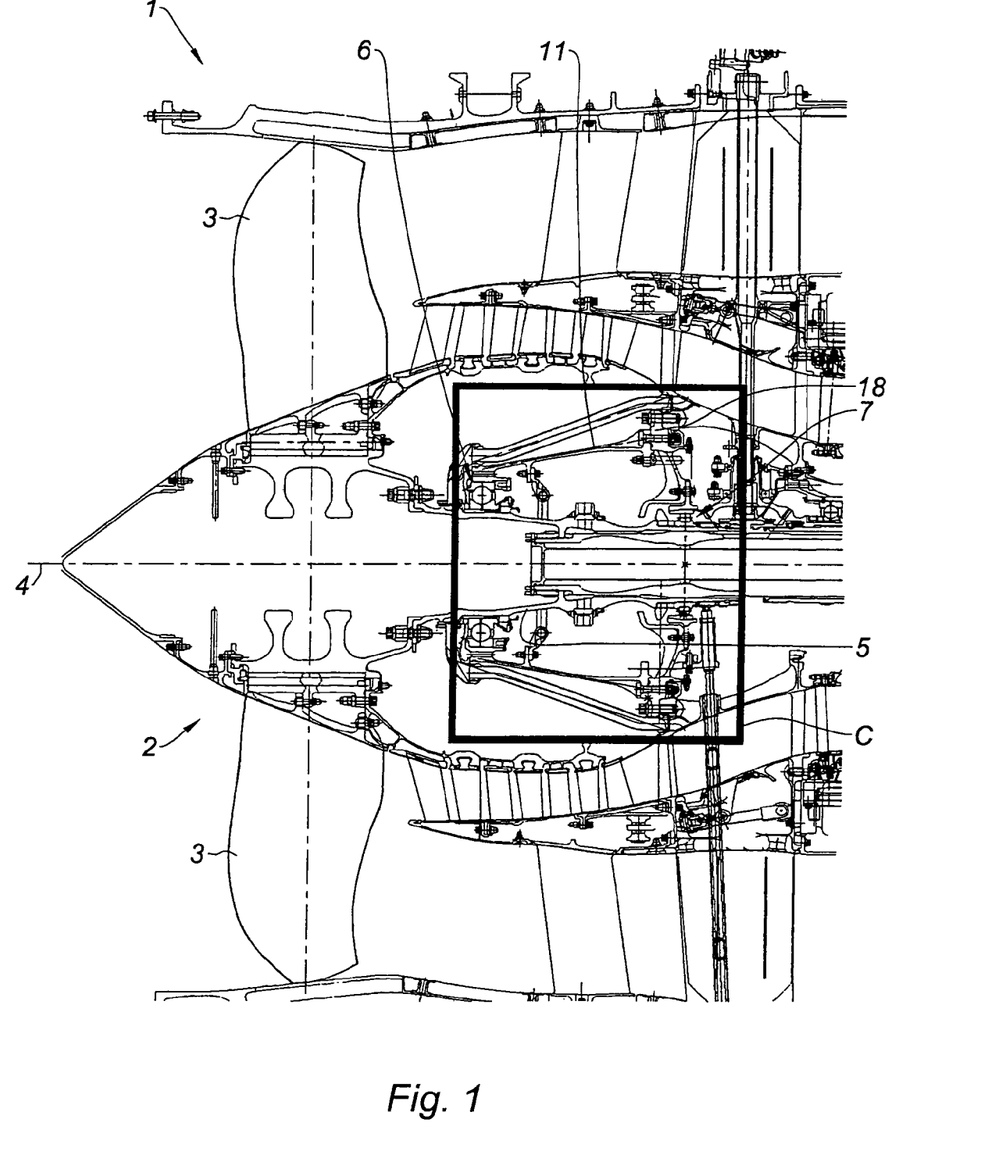
FIG. 1 shows an axial section profile view of the preferred embodiment of the invention.

With reference to FIG. 1, the turbo-jet engine of the invention comprises a fan 2, whose rotor has blades 3 extending radially around the axis 4 of the jet engine. The fan shaft 2 is fixed, downstream from blades 3, to the compressor shaft 5 of globally cylindrical shape. This is the low pressure compressor shaft. In the remainder of this description the assembly of the fan shaft 2 and compressor shaft 5 shall be referred to as the compressor shaft 5 or drive shaft 5. The compressor shaft is supported by a first bearing 6 and a second bearing 7 located downstream of the first bearing 6.

Figure 2:
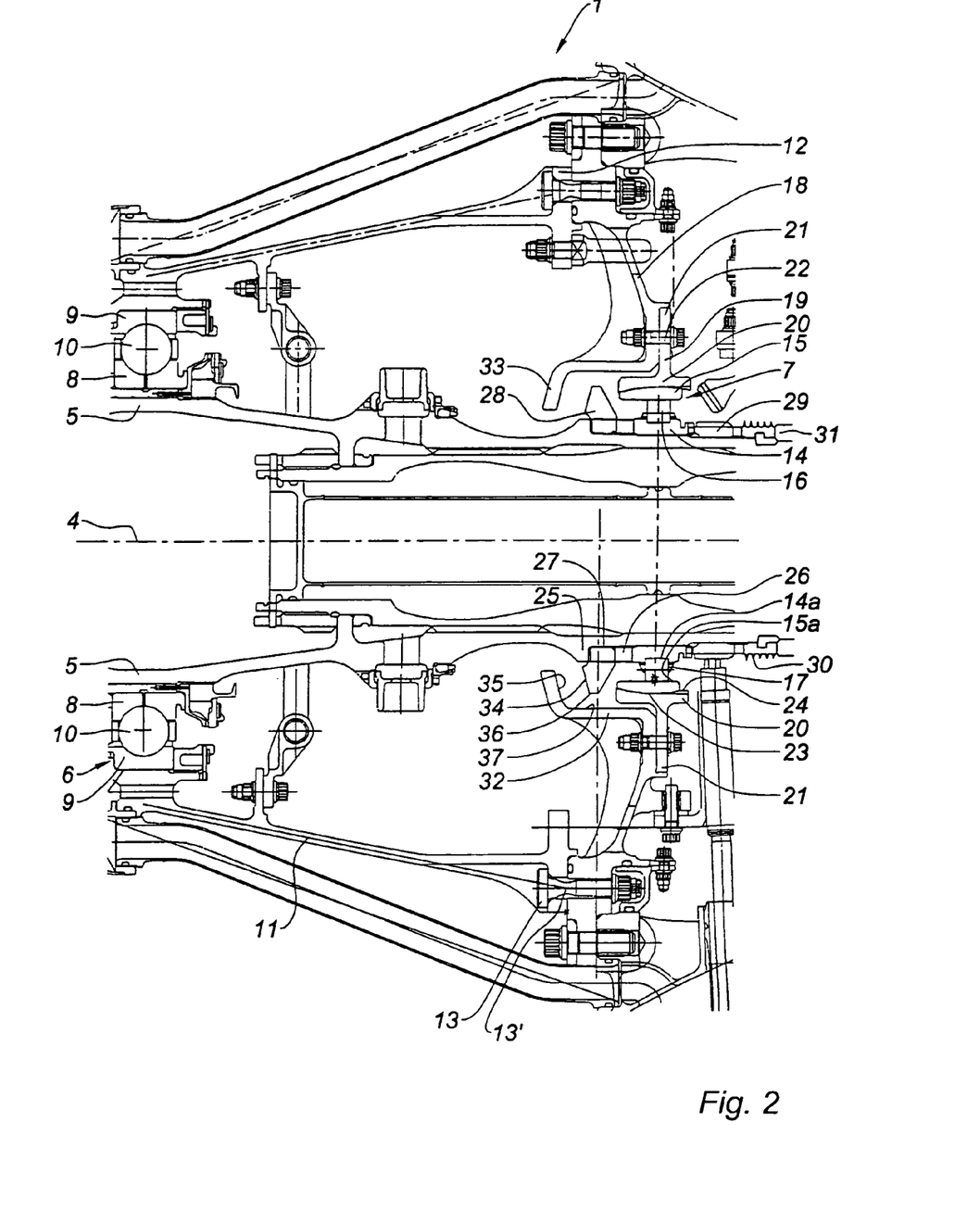
FIG. 2 is an enlarged view of the area in FIG. 1 contained within space C.

With reference to FIG. 2, the first bearing comprises an inner ring 8 and an outer ring 9, between which ball-bearings 10 are mounted. The inner ring 8 is mounted integral with the compressor shaft 5 and the outer ring integral with a bearing support piece 11, called hereinafter first bearing support 11. The ball-bearings 10 allow rotation of the inner ring 8, and hence of the compressor shaft 5, with respect to the outer ring 9, and hence with respect to the first bearing support 11.

The first bearing support 11 extends from the first bearing 6 in downstream direction; it is of globally cylindrical shape, slightly conical, its diameter increasing in downstream direction. It is mounted on a flange 18 of the fixed structure of the jet engine 1, integral in particular with the intermediate casing of the engine, and hereinafter called structural flange 18, by means of a downstream clamp 12 in which shearing screws 13 are screwed. These shearing screws 13 comprise a weakened portion 13' having low resistance to traction forces leading to their rupture when stresses become too high, in particular when an imbalance occurs on the compressor shaft 5 subsequent to loss of a blade 3 in particular.

The second bearing 7 comprises an inner ring 14 and an outer ring 15, between which rollers 16 are mounted. The inner ring 14 is mounted integral with the compressor shaft 5, and the outer ring 15 is mounted integral with the fixed structure of the jet engine 1 when in normal operation, as will be described below. The rollers 16 are mounted parallel to the axis 4 of the jet engine 1, in a channel 14a extending around the circumference of the inner ring 14, and are held distant from one another by a retainer 17 well known to persons skilled in the art. They allow rotation of the inner ring 14 with respect to the outer ring 15, and thereby of the compressor shaft 5 with respect to the fixed structure of the jet engine 1.

The second bearing 7 is supported by a bearing support piece 19, hereinafter called second bearing support 19, comprising a housing 20, or ring 20, which tightly surrounds the outer ring 15 of the second bearing 7, on whose circumference a fixation clamp 21 extends radially, screwed to the structural flange 18 by shearing screws 22.

The outer ring 15 of the second bearing 7 comprises an outer surface 23 of convex spherical shape when viewed in axial section. This convex spherical surface 23 fits onto the inner surface 24 of ring 20 of the second bearing support 19, of concave spherical shape. The two spherical surfaces, convex 23 and concave 24, between them form a connection forming a ball-joint (23, 24). They are arranged so that under normal operation of the jet engine 1, the connection forming a ball joint (23, 24) does not rotate. The outer ring 15 of the second bearing 7 is then fixed with respect to the second bearing support 19 and hence with respect to the fixed parts of the jet engine 1. Its behavior in the event of loss of a blade 3 is described further on.

The description of the structure of the elements of jet engine 1 in the region of the second bearing 7 will be made by describing the mounting of its elements, with reference to FIGS. 3 to 6, which will contribute towards the understanding of their arrangement.

Figure 3:
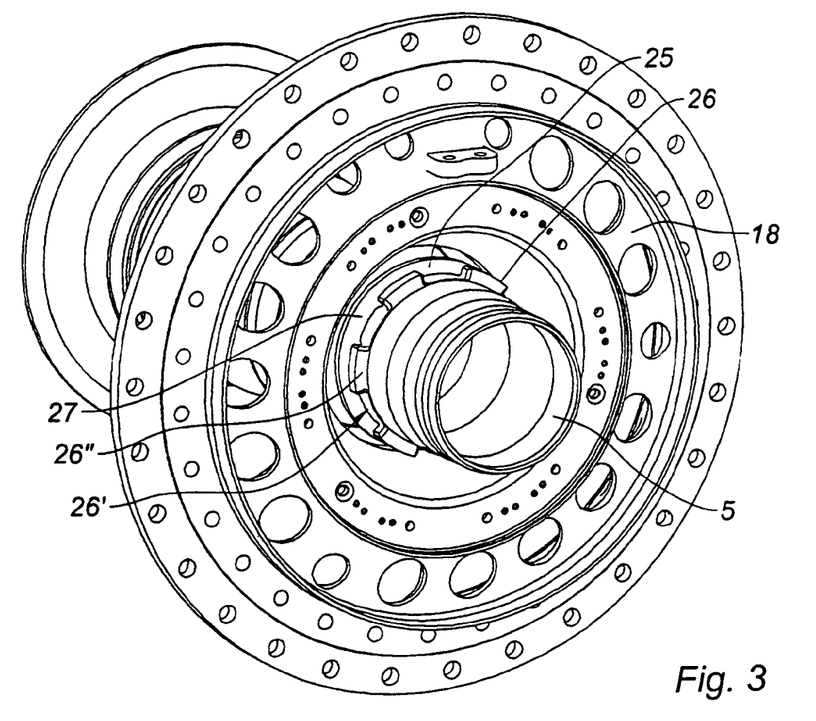
FIG. 3 is a perspective rear view of the compressor shaft and structural flange of the preferred embodiment of the invention.

With reference to FIG. 3, the compressor shaft 5, above the structural flange 18, comprises two projecting annular portions, upstream 25 and downstream 26, forming an annular groove 27. Projecting portion 26 comprises radial notches 26', thereby forming teeth 26" between them. Teeth 26" and notches 26' are preferably of equal circumferential size and therefore, overall, each extend over one half of the circumference of the compressor shaft 5.

Figure 4:
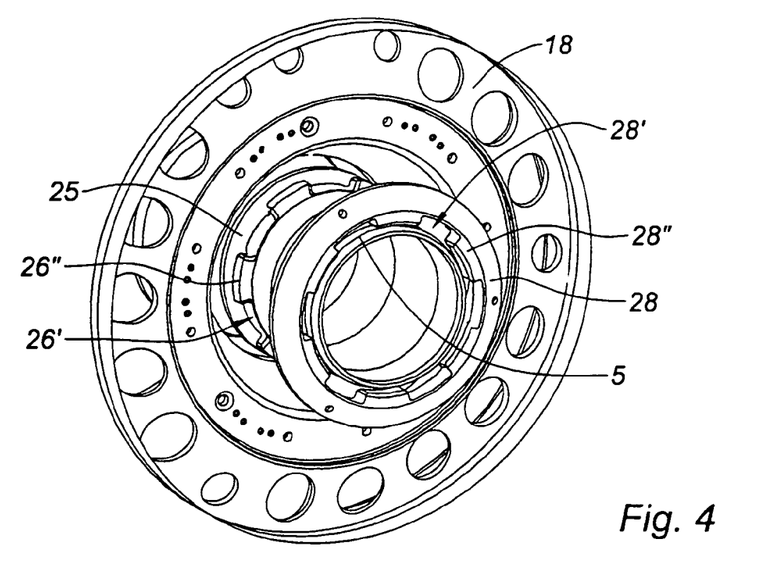
FIG. 4 is an exploded, perspective, rear view of the compressor shaft, the structural flange and retaining ring in the preferred embodiment of the invention.

With reference to FIG. 4, a retaining disk 28 is mounted in the annular groove 27 of the compressor shaft 5. This retaining disk 28, on its inner radial edge, comprises notches 28' and radial teeth 28" whose circumferential dimensions correspond to those of notches 26' and teeth 26" of compressor shaft 5. On mounting, the retaining disk 28 is fitted onto the compressor shaft 5 in upstream direction, its teeth 28" are inserted into notches 26' of the compressor shaft 5 until they abut the downstream surface of the upstream projecting annular portion 25 of compressor shaft 5; the retaining disk 28 is then rotated about axis 4 of the jet engine 1 until its teeth 28" are axially aligned with the teeth of the compressor shaft 5; in this position they are hemmed between the downstream surface of the upstream projecting annular portion 25 and the upstream surface of teeth 26" of compressor shaft 5, whilst the notches 26', 28' of the compressor shaft 5 and of retaining disk 28 are axially aligned.

Figure 5:
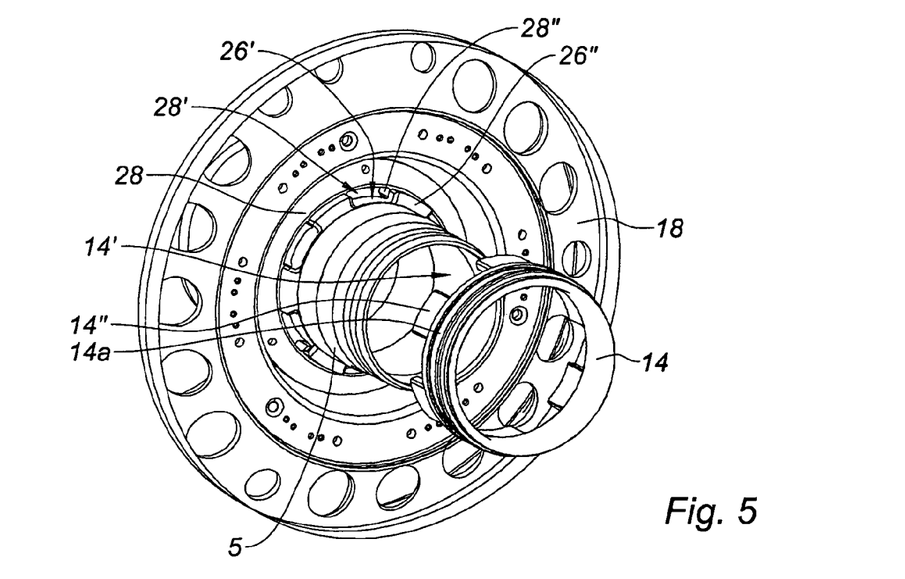
FIG. 5 is an exploded, perspective, rear view of the compressor shaft, the structural flange, retaining ring and inner ring of the second bearing in the preferred embodiment of the invention.

With reference to FIG. 5, the inner ring 14 of the second bearing 7, on its upstream portion, comprises notches 14' and longitudinal teeth 14", whose circumferential dimensions correspond to the circumferential dimensions of notches 26', 28' and of teeth 26", 28" previously described. The inner ring 14 is fitted onto the compressor shaft 5 and its teeth 14" are inserted in notches 26', 28' of compressor shaft 5 and of retaining disk 28 until they abut the downstream surface of the upstream projecting annular portion 25 of the compressor shaft 5, the transverse surface of its notches 14' then abutting teeth 26" of the compressor shaft 5. Therefore, the teeth 14" of the inner ring 14 lock the retaining disk 28 in rotation, whose teeth 28"" axially abut the teeth 26" of the compressor shaft 5.

Figure 6:
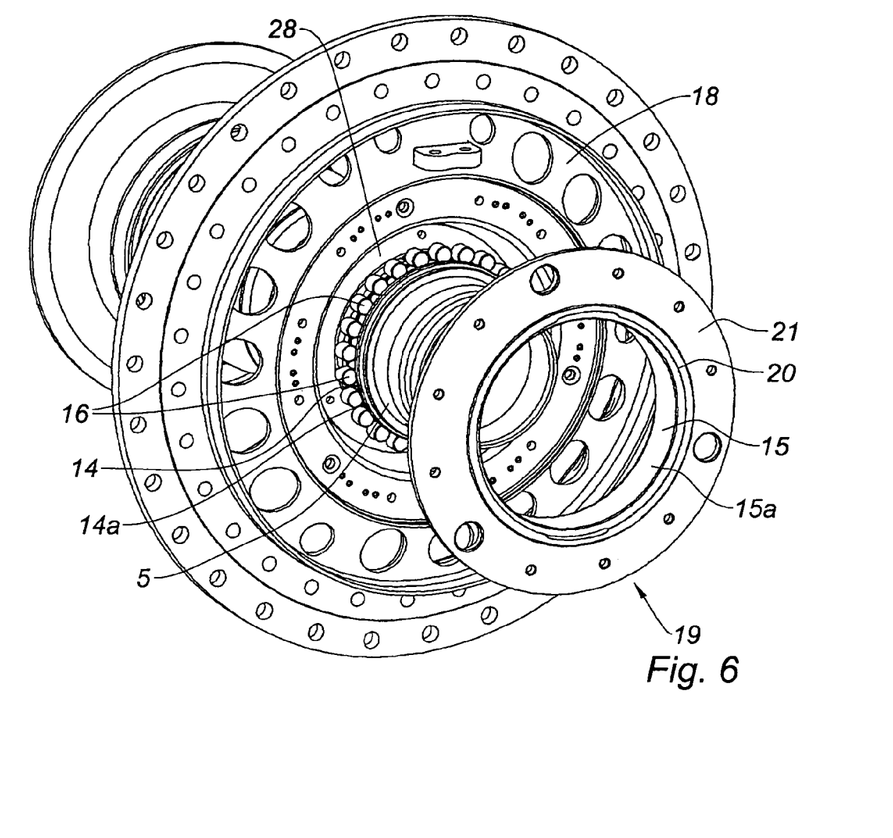
FIG. 6 is an exploded, perspective, rear view of the compressor shaft, structural flange, retaining ring, inner ring of the second bearing and the support for the second bearing in the preferred embodiment of the invention.

With reference to FIG. 6, the rollers 16 are mounted on the inner ring 14, in channel 14a provided for this purpose; the retainer 17 holding them together is not shown. The outer ring 15 of the second bearing 7, mounted in the second bearing support 19, is fitted around rollers 16; the inner surface 15a of the outer ring 15 is rectilinear, from an axial section viewpoint, having a greater longitudinal dimension than rollers 16. The clamp 21 of the second bearing support 19 is fixed to the structural flange 18 via shearing screws 22.

Figure 7:
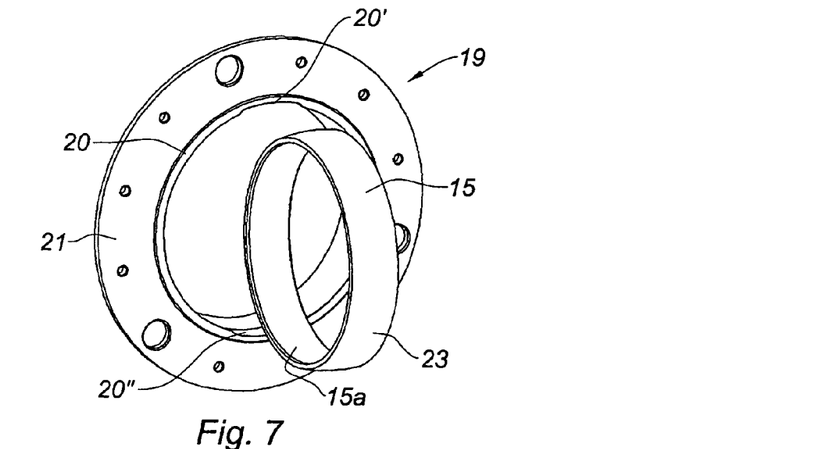
FIG. 7 is a schematic perspective view of the mounting of the outer ring in the support of the second bearing in the preferred embodiment of the invention.

The mounting of the outer ring 15 of the second bearing 7 in the ring 20 of the second bearing support 19, so as to form the connection forming a ball joint (23, 24), will now be explained with reference to FIG. 7. The ring 20 of the second bearing support 19 comprises two mounting notches 20', 20", that are diametrically opposite, whose circumferential dimension corresponds to the longitudinal dimension of outer ring 15 of the second bearing 7. The outer ring 15 is shown on the side facing the second bearing 19 and is slipped into these notches 20', 20". It is then rotated 90° so that its outer surface 23 bears upon the inner surface 24 of ring 20 of the second bearing support 19, thereby forming a connection forming a ball joint (23, 24).

Other elements may be fitted onto the compressor shaft 5 downstream from inner ring 14 of the second bearing 7. For example, in this case, with reference to FIGS. 1 and 2, a movement capturing device 29 is provided to drive other elements by means of the movement of compressor shaft 5, together with a so-called labyrinth joint 30. Once all the elements have been fitted, the assembly is axially locked by a lock nut 31.

Figure 8:
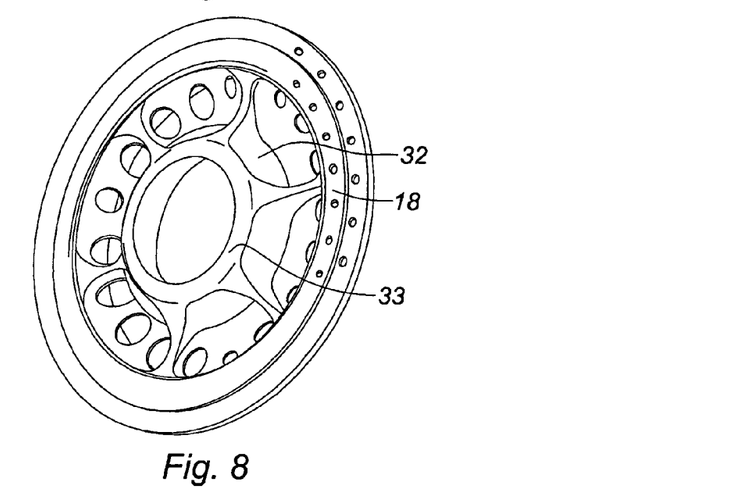
FIG. 8 is a perspective view of the structural flange in the preferred embodiment of the invention.

With reference to FIG. 8, the structural flange 18 is bored in its centre. In its central part, it comprises a longitudinal sleeve 32, at whose upstream end a stop disk 33 extends continuously and radially inwards, whose inner edge forms the central bore of flange 18. The stop disk 33 is arranged so that the upstream surface 34 of the retaining disk 28 is able to bear upon its downstream surface 35. The bearing surfaces 34, 35 formed by these two surfaces 34, 35 are arranged complementary fashion so that the bearing of one on the other is as homogeneous as possible. In the embodiment described herein of turbo-jet engine 1 of the invention, the bearing surfaces 34, 35 are of conical shape. These bearing surfaces could also be planar, or advantageously spherical. The function of the stop disk 33 is to axially block the compressor shaft 5 in the event of rupture, so that the fan 2 that is integral therewith is not driven forwardly as will be explained below.

The functioning of the turbo-jet engine 1 of the invention in the event of loss of a blade 3 of fan 2 will now be described in more detail.

The loss of a blade 3 causes an imbalance on the compressor shaft 5. The induced stresses cause rupture of the shearing screws 13 fixing the first bearing support 11 to the structural flange 18, and the uncoupling of this support 11 from the fixed structure of the jet engine 1.

The second bearing 7 is subsequently not necessarily uncoupled from the fixed structure of the jet engine 1, the connection forming a ball joint (23, 24) making it possible to absorb some flexion of the compressor shaft 5. We have seen that adjustment of the outer ring 15 of the second bearing 7 in the ring 20 of the second bearing support 19 is made so that the connection forming a ball joint (23, 24) does not rotate under normal operation of the jet engine 1, but is able to rotate in the event of imbalance on the compressor shaft 5. Therefore, flexion of the compressor shaft 5 causes rotation of the connection forming a ball joint (23, 24) about the centre of the sphere defined by the spherical surfaces 23, 24 forming this sphere.

Should the flexion of compressor shaft 5 be too extensive, however, or should this flexion not be absorbable by simple rotation of the connection forming a ball joint (23, 24) in particular if flexion is off-centred with respect to axis 4 of the jet engine 1, the shearing screws 22 fixing the second bearing support 19 to the structural flange 18 will break. This rupture enables radial movement of the second bearing 7 and of its support 19. In addition, longitudinal movements are allowed by axial sliding of rollers 16 on the inner surface 15a of outer ring 15 of the second bearing 7, whose longitudinal dimension is greater than that of the rollers 16.

Therefore, through the invention, the uncoupling kinematics of the first bearing 6 are tolerated at the second bearing 7 without causing the onset of excess stresses on rollers 16, since radial, longitudinal and angular movements are permitted at the second bearing 7. The movements of the parts are not hindered.

Should rollers 16 break, however, the retaining disk 28, via its radial outer surface 36, is able to abut the inner surface 37 of the longitudinal sleeve 32 of flange 18; these then act as emergency bearing. Should this function be required for disk 28 and sleeve 32, the radial distance between the outer surface 36 of the retaining disk 28 and inner surface 37 of the longitudinal sleeve 32 may be sized accordingly.

Figure 9:
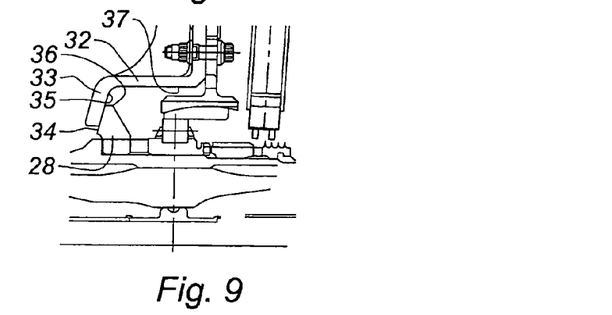
FIG. 9 is schematic side section view of the second bearing in the preferred embodiment of the invention, after rupture of the compressor shaft.

Rupture of the compressor shaft 5 may, however, occur despite the various safety devices described above. An ultimate safety system is therefore provided. In the event of rupture of the compressor shaft 5, the rotation of fan 2 drives the fan forwardly with the compressor shaft 5 with which it is integral. The upstream surface 34 of the retaining disk 28 then comes to abut the downstream surface 35 of the stop disk 33, integral with the fixed structure of the jet engine 1. The stop disk 33 therefore acts as axial stop for the fan 2 in the event of rupture of the compressor shaft 5 (or of the turbine shaft with which the compressor shaft 5 is integral). The advantage of a spherical shape for the two bearing surfaces 34, 35 of retaining disk 28 and of stop disk 33 respectively becomes clearly apparent here; it enables homogeneous contact irrespective of the incline of the compressor shaft 5 with respect to the structural flange at the time of contact.

On and after contact, the stresses are transmitted by the retaining disk 28 to its teeth 28" which transmit the same to teeth 26" of compressor shaft 5 and hence to the compressor shaft 5. Therefore, through the arrangement of the retaining disk 28 and of inner ring 14 of the second bearing 7 on the compressor shaft 5, the stresses caused by axial retaining of fan 2 by stop disk 33 are not transmitted to the lock nut 31, a transmission which would have disastrous consequences since rupture of the lock nut 31 would lead to the sliding of the various elements fitted around the compressor shaft 5 and the forward expelling of fan 2 and of compressor shaft 5; on the contrary, however, these stresses are transmitted to the compressor shaft 5.

With the device of the invention it is therefore possible to ensure axial retaining of the compressor shaft, and hence of fan 2 at the second bearing 7 with no transmission of any retaining stresses to the lock nut 31 of the second bearing 7.

The emergency bearing device and the axial retaining of the jet engine according to the invention have been described in combination with the connection forming a ball joint (23, 24) since their functions are complementary.

Evidently, the device of the invention, with its retaining disk 28 and stop disk 33, arranged so that their contact stresses are not transmitted to the lock nut 31 but directly to the compressor shaft 5, may be applied to any type of jet engine comprising a compressor shaft 5 supported by two bearings 6,7 irrespective of the type of these two bearings 6,7.

Figure 10:
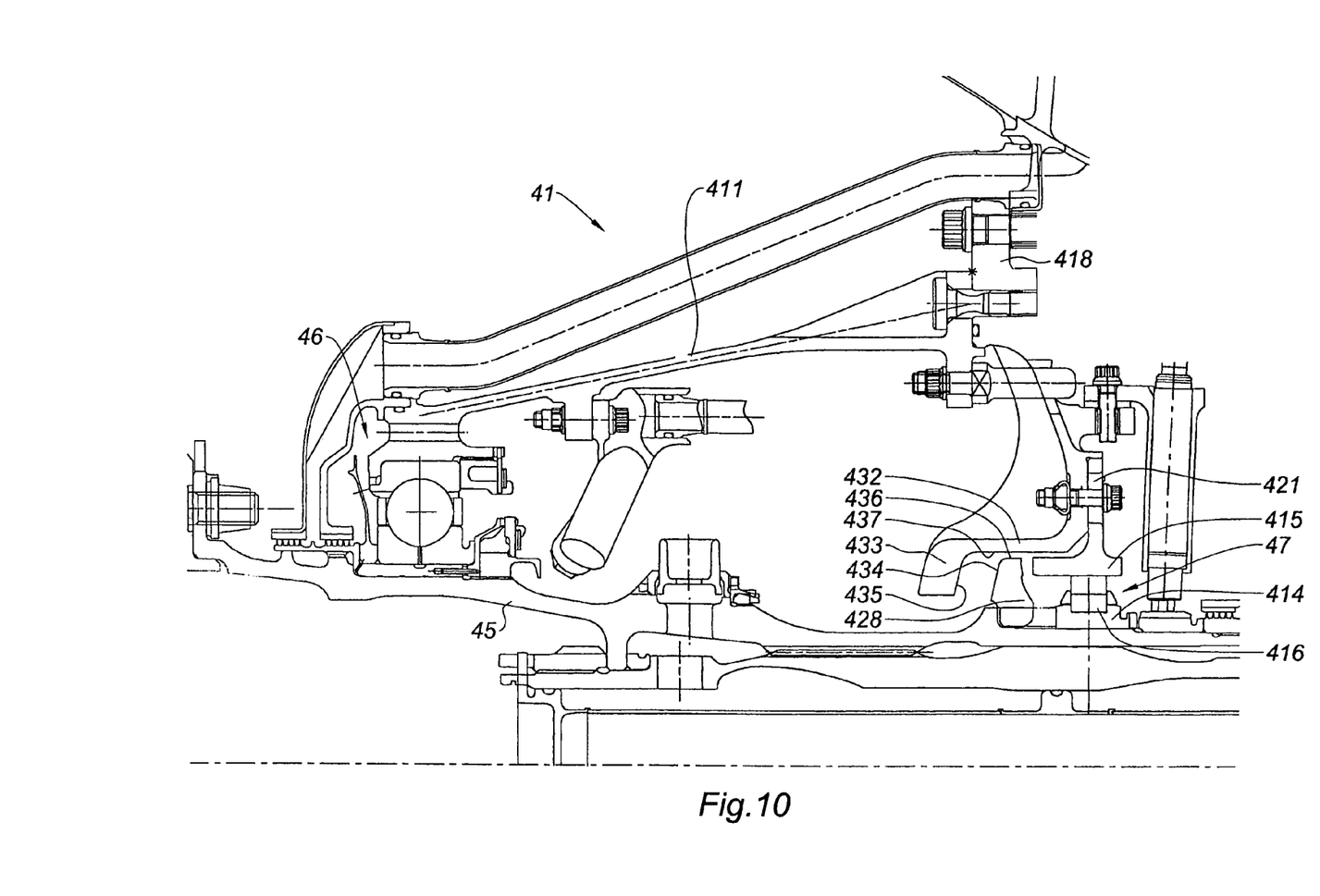
FIG. 10 shows a section view of another embodiment of the invention.

For example, in FIG. 10, a turbo-jet engine 41 can be seen that is practically similar to the jet engine 1 previously described. In particular it comprises a drive shaft 45 supported by a first bearing 46 and a second bearing 47. The first bearing 46 is supported by a support piece 411 attached to a flange 418, similar to flange 18 previously described. The flange 418, in its central part, also comprises a longitudinal sleeve 432 at whose upstream end is a stop disk 433 extending continually and radially inwards, whose inner edge forms the central bore of flange 418.

The second bearing 47 comprises an inner ring 414 similar to inner ring 14 described above, and an outer ring 415 between which rollers 416 are mounted. The outer ring 415, on its outer circumference, comprises a fixation clamp 421 fixed to flange 418. A retaining disk 428 similar to retaining disk 28 described above is mounted on the drive shaft 45 in similar manner.

The retaining disk 428 here is arranged so that the radial distance between its outer surface 436 and the inner surface 437 of the longitudinal sleeve 432 is fairly short, so that the emergency bearing function of the retaining disk 428 and of the longitudinal sleeve 432 can be properly ensured. Therefore, should rollers 416 break, the outer surface 436 of the retaining disk 428 will come to abut the inner surface 437 of the longitudinal sleeve 432 to fulfill its function as emergency bearing, without radial displacement being too extensive.

As before, in the event of rupture of the compressor shaft 45, the upstream surface 434 of the retaining disk 428 comes to abut the downstream surface 435 of the stop disk 433, which acts as axial stop for the fan in the event of rupture of the compressor shaft 45. As before, the two bearing surfaces involved 434, 435 may be planar, transverse, conical or spherical.

The invention claimed is:

1. A turbo-jet engine comprising:
    a fixed structure;
    a fan rotor fixed to a drive shaft supported by a first bearing and a second bearing;
    an axial retaining device configured to cooperate with the fixed structure and mounted rigidly to the drive shaft; and
    a structural flange on which the second bearing is fixed, wherein the axial retaining device is configured to form an emergency bearing and includes a retaining disk mounted on the drive shaft, the retaining disk configured to cooperate with a stop disk on the flange to axially retain the fan and further configured to cooperate with a longitudinal sleeve of flange to form a bearing surface.

2. The turbo-jet engine as recited in claim 1, wherein the axial retaining device is arranged to transmit axial stresses directly to the drive shaft.

3. The turbo-jet engine as recited in claim 2, wherein the second bearing includes an inner ring, an outer ring and rollers mounted between said inner and outer rings, the retaining disk includes radial teeth axially bearing upon teeth of the drive shaft and locked in rotation by longitudinal teeth of the inner ring of the second bearing.

4. The turbo-jet engine as recited in claim 3, wherein the outer ring has a radially exterior surface configured to mate with a housing connected to the flange, and the radially exterior surface and housing mate together as a ball joint.

5. The turbo-jet engine as recited in claim 1, wherein the axial retaining device includes an upstream bearing surface, and the structural flange includes a downstream bearing surface against which downstream bearing surface the upstream bearing surface slides in the event of a decoupling of the first bearing from the fixed structure, and downstream is a direction taken traveling from the first bearing toward the second bearing along an axis of the turbo-jet engine, and upstream is a direction opposite the downstream direction.

6. The turbo-jet engine recited in claim 5, wherein one of the upstream and downstream bearing surfaces is spherical.

7. The turbo-jet engine recited in claim 5, wherein the retaining disk is upstream of the second bearing.

8. The turbo-jet engine as recited in claim 1, wherein the retaining disk includes a radial bearing surface configured to slide against an interior annular surface of the flange while the first bearing is in a state decoupled from the fixed structure.

9. The turbo-jet engine as recited in claim 8, wherein the retaining disk includes an axial bearing surface configured to slide against a conical surface of the flange while the first bearing is in the state decoupled from the fixed structure.

10. The turbo-jet engine as recited in claim 1, further comprising first shearing screws connecting the flange to the first bearing via a first bearing support.

11. The turbo-jet engine as recited in claim 10, further comprising second shearing screws connecting the second bearing to the flange and which are configured to shear to allow the retaining disk to make contact with the flange.

12. The turbo-jet engine as recited in claim 11, wherein the second bearing includes rollers configured to permit axial movement of the shaft relative to the fixed structure after the second shearing screws break, but before the retaining disk makes contact with the flange.

13. The turbo-jet engine as recited in claim 1, wherein the retaining disk is mounted in an annular groove of the drive shaft.

14. The turbo-jet engine as recited in claim 1, wherein the retaining disk is mounted on the drive shaft downstream of the flange when downstream is a direction taken traveling from the first bearing toward the second bearing along an axis of the turbo-jet engine.

* * * * *